United States Patent [19]

Baker

[11] 4,270,163

[45] May 26, 1981

[54] BRIDGE CONVERTER CIRCUIT

[75] Inventor: Richard H. Baker, Bedford, Mass.

[73] Assignee: Exxon Research & Engineering Company, Florham Park, N.J.

[21] Appl. No.: 63,347

[22] Filed: Aug. 2, 1979

Related U.S. Application Data

[63] Continuation of Ser. No. 944,608, Sep. 21, 1978, abandoned.

[51] Int. Cl.³ .......................................... H02M 7/537
[52] U.S. Cl. ..................................... 363/43; 363/132
[58] Field of Search ............................. 363/17, 41–43, 363/59–61, 131–132; 307/106–107, 227

[56] References Cited

U.S. PATENT DOCUMENTS

| | | | |
|---|---|---|---|
| 3,105,944 | 10/1963 | Lostetter | 363/132 X |
| 3,141,110 | 7/1964 | Corry | 363/132 X |
| 3,227,889 | 1/1966 | Paynter | 363/43 X |
| 3,299,370 | 1/1967 | Massey | 363/17 X |
| 3,325,719 | 6/1967 | Gillet | 363/132 |
| 3,510,749 | 5/1970 | Resch | 363/42 |
| 3,581,212 | 5/1971 | McMurray | 363/43 X |
| 3,867,643 | 2/1975 | Baker et al. | 363/43 X |

*Primary Examiner*—J. D. Miller
*Assistant Examiner*—Peter S. Wong

*Attorney, Agent, or Firm*—Kenneth Watov

[57] ABSTRACT

A converter includes a full-wave bridge network across which operating voltages of +E and −E volts are applied, diagonal legs of the bridge each including two semi-conductor switches connected in series between individual operating voltage and output terminals, two diodes polarized in one direction being connected for conducting current from a point of reference potential to the centralmost switches of the two upper legs, respectively, and another two diodes like polarized in another direction being connected for conducting current from the centralmost switches of the two lower legs, respectively, to the point of reference potential. Each diode and its associated switch form a unidirectional gated current path and the vertically opposing centralmost switch and diode pairs of the upper and lower legs form a bidirectional gated current path. The switches are operable for providing zero, +E, +2E, −E, and −2E volts across a load in some predetermined sequence for producing a desired AC voltage waveform across the load. The diodes also serve to clamp the common connections between their associated two semiconductor switches to within a diode drop of the reference potential, thereby protecting the switches from overvoltage.

21 Claims, 7 Drawing Figures

Fig_5_

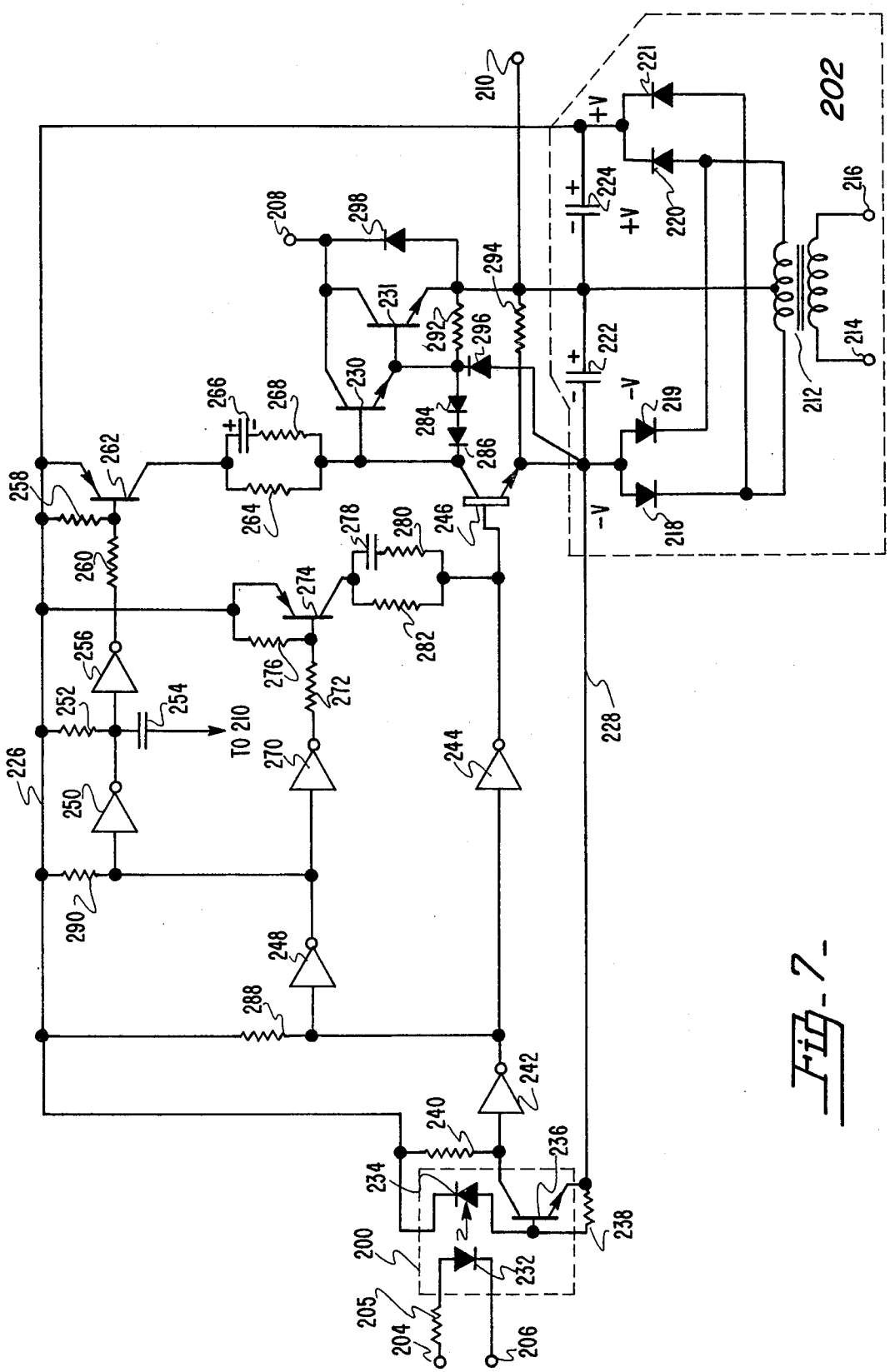

BRIDGE CONVERTER CIRCUIT

This is a continuation of application Ser. No. 944,608 filed Sept. 21, 1978, now abandoned.

Converter circuits of the prior art require one or more transformers and extensive filtering networks, all of which tends to reduce the efficiency and reliability of such converters. A number of converter systems in the prior art include in each leg of their bridge network two transistors connected in cascode, but such connections generally require that the transistors be very closely matched in their dynamic, as well as their static, characteristics, and that the voltage ratings of the transistors, such as the $V_{CEX}$ (the maximum collector-to-emitter voltage with some backbias voltage applied to the base electrode) be much greater than the level of the operating voltages applied across the bridge, to prevent destruction of the transistors from overvoltage and the inherent reduced reliability of the system.

The present bridge converter circuit does not require the use of transformers. In one embodiment of the invention, transistors in each leg of the bridge have $V_{CEX}$ ratings substantially equal to the level of the operating voltages applied across the bridge. This is accomplished by including two transistors connected in cascode in each leg of the bridge, with a clamping diode connected to the common connection between the transistors of each leg of the bridge and a point of reference potential, for substantially limiting the voltage across the collector-emitter electrodes of each transistor in its cutoff state to no greater than the level of the operating voltage applied to the associated operating voltage terminal of the bridge. The centralmost four transistors, in combination with their associative diodes, which are polarized for providing a unidirectional current conduction path between a point of reference potential and their associated transistors, are operable for providing a bidirectional gated current path between their respective output terminal and the point of reference potential. In other embodiments of the invention, more than two transistors are connected in cascode in each leg of the bridge, with diodes individually connected from the common connections between the transistors of each leg to different terminals for receiving different levels of DC voltage, respectively, thereby permitting the $V_{CEX}$ ratings of the transistors to be substantially lower than the levels of the DC voltages being switched. The transistors are operable to various combinations of their saturated and cutoff states, in a predetermined sequence, for converting the DC operating voltages connected to the bridge to a desired AC voltage for application across a load connected between the output terminals of the bridge. AC to AC conversion is provided by including a rectifier circuit for rectifying an AC input voltage to produce the DC operating voltages for application across the bridge. By adding additional legs of cascoded switches to the bridge, polyphase AC output voltages are obtained. The arrangement of the diodes and transistors of each embodiment of the invention, permit bidirectional current flow between the load and the bridge converter at all times, thereby substantially eliminating voltage spiking and waveform distortion problems associated with changes in the level or polarity of the output waveform, while driving an inductive load.

In summation, a first embodiment of the invention consists of a bridge converter circuit, comprising a first operating voltage terminal for receiving $+E$ volts; a second operating voltage terminal for receiving $-E$ volts; a reference voltage terminal for receiving a reference potential; first and second output terminals for connection to a load therebetween; first and second banks of switches located in diagonally opposing arms of said bridge converter, each bank having first, second, and third terminals, their first terminals being individually connected to said first and second operating voltage terminals, respectively, and their second terminals being individually connected to said first and second output terminals, respectively; first diode means having an anode electrode connected to said reference voltage terminal, and a cathode electrode connected to the third terminal of and in combination with said first bank of switches forming a gated unidirectional current path; and second diode means having a cathode electrode connected to said reference voltage terminal, and an anode electrode connected to the third terminal of and in combination with said second bank of switches forming a gated unidirectional current path; said first and second banks of switches each being operable to a first condition for electrically connecting their respective second and third terminals together, to a second condition for electrically connecting their respective first, second and third terminals, together, said first and second banks of switches being concurrently operable to their first conditions for producing zero volts across said load, to their second and first conditions, respectively, for producing $+E$ volts across said load, and to their second conditions for producing $+2E$ volts across said load, whereby said first and second banks of switches are repetitively operable through a given sequence of the latter three combinations of their respective conditions, for producing a predetermined half-wave positive polarity AC voltage waveform across said load.

In the drawings, wherein like elements have the same reference designation:

FIG. 7 is a circuit schematic diagram of a floating transistorized switch for providing each one of the single-pole-single-throw switches in each embodiment of the invention.

Figure 1:
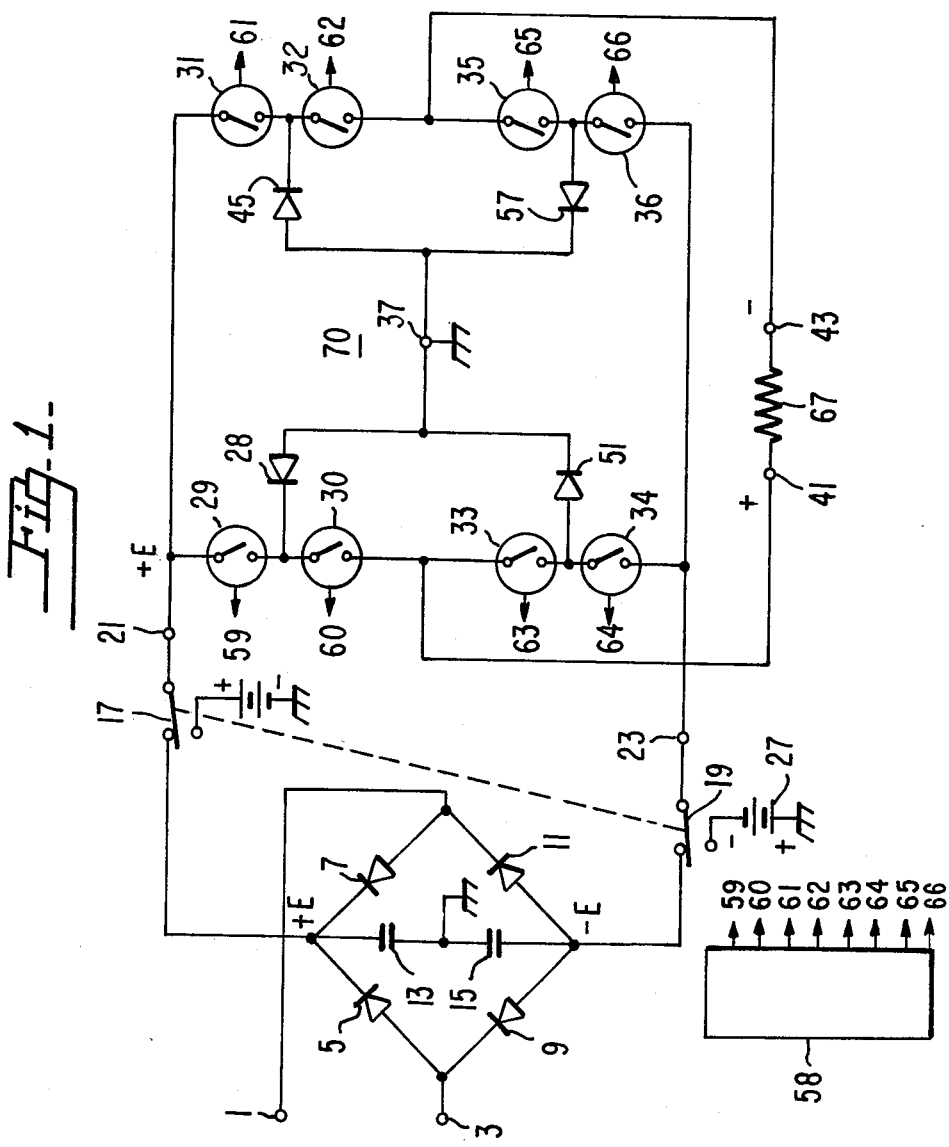
FIG. 1 is a circuit schematic diagram of a first embodiment of the invention.

In FIG. 1, a first embodiment of the invention includes a full-wave bridge rectifier having input terminals 1,3 for receiving an AC input voltage, such as 240 volts, 60 $H_z$, four diodes 5,7,9 and 11, and two filter capacitors 13,15. The neutral connection for the AC power line applied to the rectifier is connected to a source of reference potential, power (chassis) ground in this example. As shown, the rectifier produces a positive DC operating voltage having a level of $+E$ volts, and a negative DC operating voltage having a level of $-E$ volts. The operating voltages $+E$ and $-E$ from the rectifier, are applied via the two single-pole-double-throw ganged switches 17,19 (operated to the positions shown) to the operating voltage terminals 21,23, respectively. Alternatively, the operating voltages +E and −E can be derived directly from DC voltage sources by operating the switches 17,19 for placing their poles at their lower contacts, thereby connecting the batteries 25 and 27, for example, to the operating voltage terminals 21,23, respectively. As with the rectifier, the batteries 25,27 are referenced to chassis ground, in this example. It should be noted that when the ganged switches 17,19 are positioned as shown, the bridge converter circuit operates as an AC to AC converter, whereas when the ganged switches 17,19 are positioned with their poles at their lower contacts, the bridge converter circuit is reconfigured as a DC to AC converter, more commonly known as an inverter. Any rectifier capable of rectifying a given AC voltage to produce positive and negative DC voltages referenced to a common source of reference potential can be used in substitution of the rectifier circuit shown, and similarly, the batteries 25,27 can be replaced by other types of DC voltage sources such as solar cells, fuel cells and the like.

The bridge network of the converter circuit includes the operating voltage terminals 21,23 for receiving operating voltages of +E and −E volts, respectively, in one upper leg two single-pole-single-throw (hereinafter designated as SPST) switches 29,30, connected in series between terminal 21 and output terminal 41, the common connection between these switches 29,30 being connected via a diode 28 to a reference voltage terminal 37, the latter being connected to power ground. The other upper leg of the bridge network includes two SPST switches 31,32 connected in series between the operating voltage terminal 21 and a second output terminal 43, the common connection between the switches 31,32 being connected via a diode 45 to the reference voltage terminal 37. One lower leg of the bridge network includes two SPST switches 33,34, connected in series between output terminal 41 and operating voltage terminal 23, respectively. The common connection between these switches 33,34 is connected via a diode 51 to the reference voltage terminal 37. The other lower leg of the bridge network includes two SPST switches 35,36 connected in series between the second output terminal 43 and the operating voltage terminal 23, respectively, with the common connection between these switches being connected via a diode 57 to the reference voltage terminal 37. The SPST switches 29–36 are shown as mechanical switches for convenience of illustration, but can also be electromechanical switch contacts such as provided by relays, or can be provided by solid-state switches or circuits capable of being controlled for providing an SPST switching function. A controller 58 is included for controlling the operation of the switches 29–36 via control lines 59 through 66. Also, a load impedance 67 is shown connected between the first and second output terminals 33, 43, respectively.

The present converter circuit of FIG. 1 is operable to a number of different combinations of operating states of the switches 29,36, the primary or practical combinations of operating states of these switches being shown in Table I. As shown in Table I, in state 6 of the converter all of the switches 29–36 are open or turned off, causing the output terminals 33 and 43 to be substantially disconnected from source of voltages provided by the bridge network, whereby zero volt is across the load 67. This combination of operating states of the switches of the bridge network 70 for obtaining zero volts across the load 67, is only practical for resistive loads 67. When the load 67 includes reactive impedances, such as inductors or some combination of inductance and capacitance, the combination of operating states of switches of bridge network 70 should be as shown for converter state 1, for obtaining zero volt across the load 67. In converter state 1, as previously described, the combination of the switches 30,32,33,35 and their associated diodes 28,45,51,57, respectively, provide a bidirectional current conduction path between each output terminal 41 and 43 and the reference potential connected to terminal 37, when these switches are closed. Thus, state 1 permits any reactive load to discharge its stored energy into the source of reference potential, substantially preventing the large voltage transients caused by suddenly removing a source of current provided by switches 29–36 from the reactive load, for example. In going from converter state 1 to converter state 2, switch 29 is closed and switch 33 is opened, for obtaining an output voltage of +E volts, whereby current flows from the operating voltage terminal 21 through the switches 29,30 to output terminal 41, through the load 67, output terminal 43, switch 35 and diode 57 to the source of reference potential connected to reference terminal 37. In going from converter state 2 to converter state 3, switch 32 is opened and switch 36 is closed, continuing +E volts applied to output terminal 41 and causing −E volts to be applied to output terminal 43, with the current flowing from operating voltage terminal 21 through the switches 29,30 through the load 67, the switches 35,36, operating voltage terminal 23, and into the voltage source supplying −E volts. In converter state 4, switches 32,33,34 and 35 are closed, and switches 29,30,31, and 36 are opened, causing current to flow from the source of reference potential connected to terminal 37, through diode 45, switch 32, output terminal 43, the load 67, output terminal 41, the switches 33,34, operating voltage terminal 23, into the source of operating voltage providing −E volts, thereby causing −E volts to be applied across the load 67. In going from converter state 4 to converter state 5, switch 35 is opened and switch 31 is closed, causing current to flow from the source of voltage providing +E volts, through terminal 21, switches 31,32, output terminal 43, load 67, output terminal 41, switches 33,34, operating voltage terminal 23, into the source of voltage providing −E volts, thereby causing −2E volts to be applied across the load 67. It should be noted that in going from any one of the converter states 1–6 into any other converter state, break-before-make switching is provided by the controller 58, for insuring that the converter is never placed in a forbidden state where the voltage supplies providing +E volts and −E volts are directly shorted to one another through the switches, such as would occur when switches 29,30,33 and 34 are concurrently closed, or when switches 31,32,35 and 36 are concurrently closed.

TABLE I

| Converter State | Operating State of Switches | | | | | | | | Level of Output Voltage |
|---|---|---|---|---|---|---|---|---|---|
| | 29 | 30 | 31 | 32 | 33 | 34 | 35 | 36 | |
| 1 | 0 | 1 | 0 | 1 | 1 | 0 | 1 | 0 | 0 |
| 2 | 1 | 1 | 0 | 1 | 0 | 0 | 1 | 0 | +E |
| 3 | 1 | 1 | 0 | 0 | 0 | 0 | 1 | 1 | +2E |
| 4 | 0 | 0 | 0 | 1 | 1 | 1 | 1 | 0 | −E |
| 5 | 0 | 0 | 1 | 1 | 1 | 1 | 0 | 0 | −2E |

TABLE I-continued

| Converter | Operating State of Switches | | | | | | | | Level of |
|---|---|---|---|---|---|---|---|---|---|
| State | 29 | 30 | 31 | 32 | 33 | 34 | 35 | 36 | Output Voltage |
| 6 | 0 | 0 | 0 | 0 | 0 | 0 | 0 | 0 | 0 |

NOTE:
(1) Switches are open or turned off in their "0" state
(2) Switches are closed or turned on in their "1" state
(3) The output voltage is developed across output terminals 33 and 43
(4) Converter state 6 is the initial power turnon state In FIG. 2, a typical AC output voltage produced by the present bridge converter circuit is shown for one period of the AC waveform between times $t_1$ and $t_{24}$. The four-level notched waveform is obtained via the controller 58 operating the bridge network 70 for providing the desired level of output voltage between times $t_1$ through $t_{24}$, the converter being placed in state 1 between times $t_2$ and $t_3$, $t_{10}$ and $t_{11}$, $t_{12}$ and $t_{13}$, $t_{14}$ and $t_{15}$, $t_{22}$ and $t_{23}$; the converter being placed in its state 2 between times $t_1$ and $t_2$, $t_3$ and $t_4$, $t_5$ and $t_6$, $t_7$ and $t_8$, $t_9$ and $t_{10}$, $t_{11}$ and $t_{12}$; the converter being placed in its state 3, between times $t_4$ and $t_5$, $t_6$ and $t_7$, $t_8$ and $t_9$; the converter being placed in its state 4 between times $t_{13}$ and $t_{14}$, $t_{15}$ and $t_{16}$, $t_{17}$ and $t_{18}$, $t_{19}$ and $t_{20}$, $t_{21}$ and $t_{22}$, $t_{23}$ and $t_{24}$; the converter being placed in its state 5 between times $t_{16}$ and $t_{17}$, $t_{18}$ and $t_{19}$, and $t_{20}$ and $t_{21}$. The controller 58 can, of course, be adjusted for varying the frequency of the AC output waveform, and in this example for varying the notching pattern of the waveform by varying the time durations between the individual times $t_1$ through $t_{24}$. In so doing, the area under the voltage waveform is varied, thereby varying the level of voltage applied to the load, and permitting variation of the power applied to the load. For example, in this manner a constant volts/Hertz output waveform can be maintained for driving an AC motor to produce a specified torque at different speeds. Numerous other waveforms can be provided by sequentially operating the bridge network 70 through predetermined ones of the converter states 1 through 5, for example. It should also be noted that a half-wave voltage output can be obtained by using only one diagonal pair of the switches of the bridge 70, such as switch pair 29,30 with switch pair 35,36, for obtaining a positive half-wave output waveform, or the diagonal pairs of switches 31, 32 and 33,34 for obtaining a negative half-wave output voltage waveform.

Figure 3:
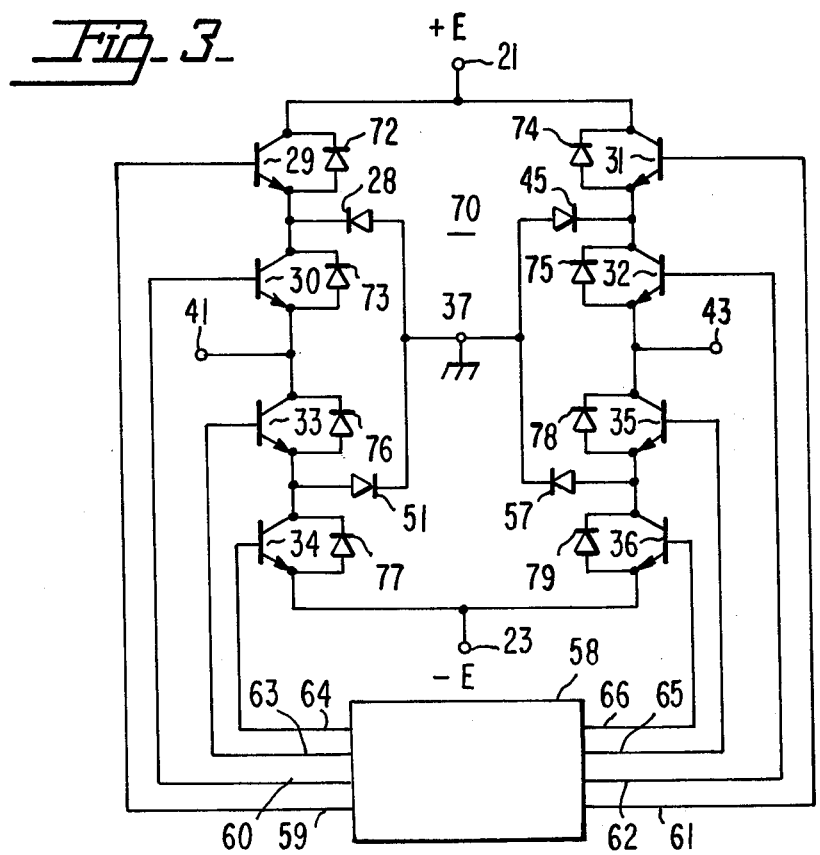
FIG. 3 shows a more detailed circuit schematic diagram of the bridge network 70 of FIG. 1.

In FIG. 3, the bridge network 70 is shown with NPN conductivity transistors providing the switches 29 through 36. With reference to Table I, when the individual control signal applied to each one of the signal lines 59 through 66 are at some low value such as the reference potential, or some negative voltage, the transistor associated with that line is turned off; contrariwise, when the respective control signal is at some positive level of voltage (1 $V_{be}+1$ diode drop), the associated transistor is turned on, as would be understood by one skilled in the art. Antiparallel diodes 72–79 are connected across the switches 29–36, respectively, of bridge network 70, for providing bilateral current flow between the bridge 70 and a load. The switches 29 through 36 of the bridge network 70 can be provided by many other different solid-state switching circuits or devices and the configuration of FIG. 3 is not to be taken as a limiting one.

Figure 2:
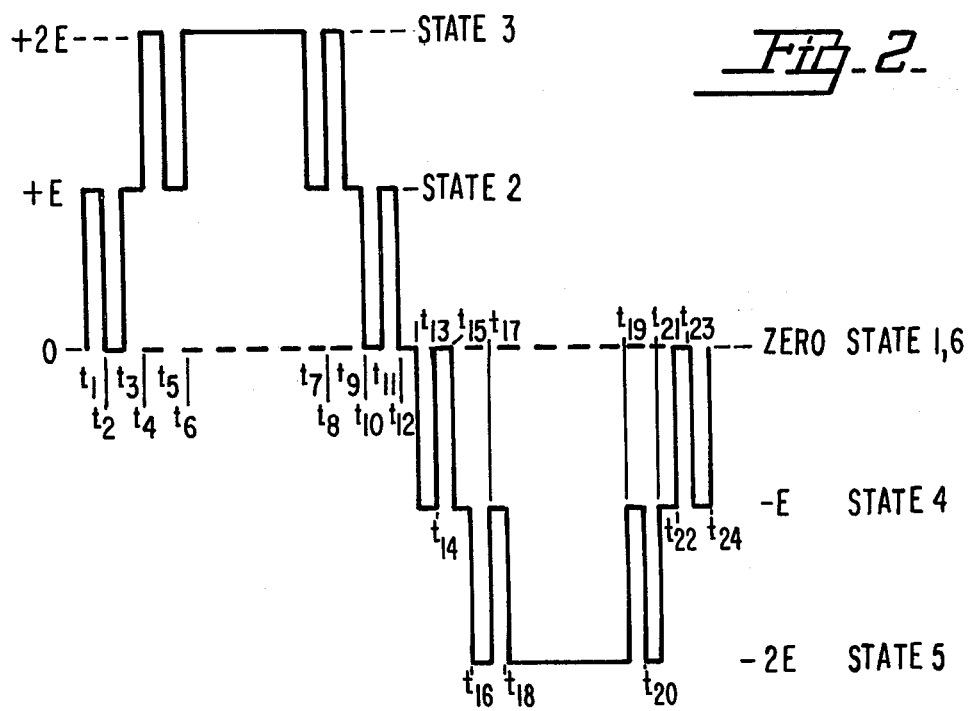
FIG. 2 shows a typical voltage waveform produced by the present invention.
Figure 4:
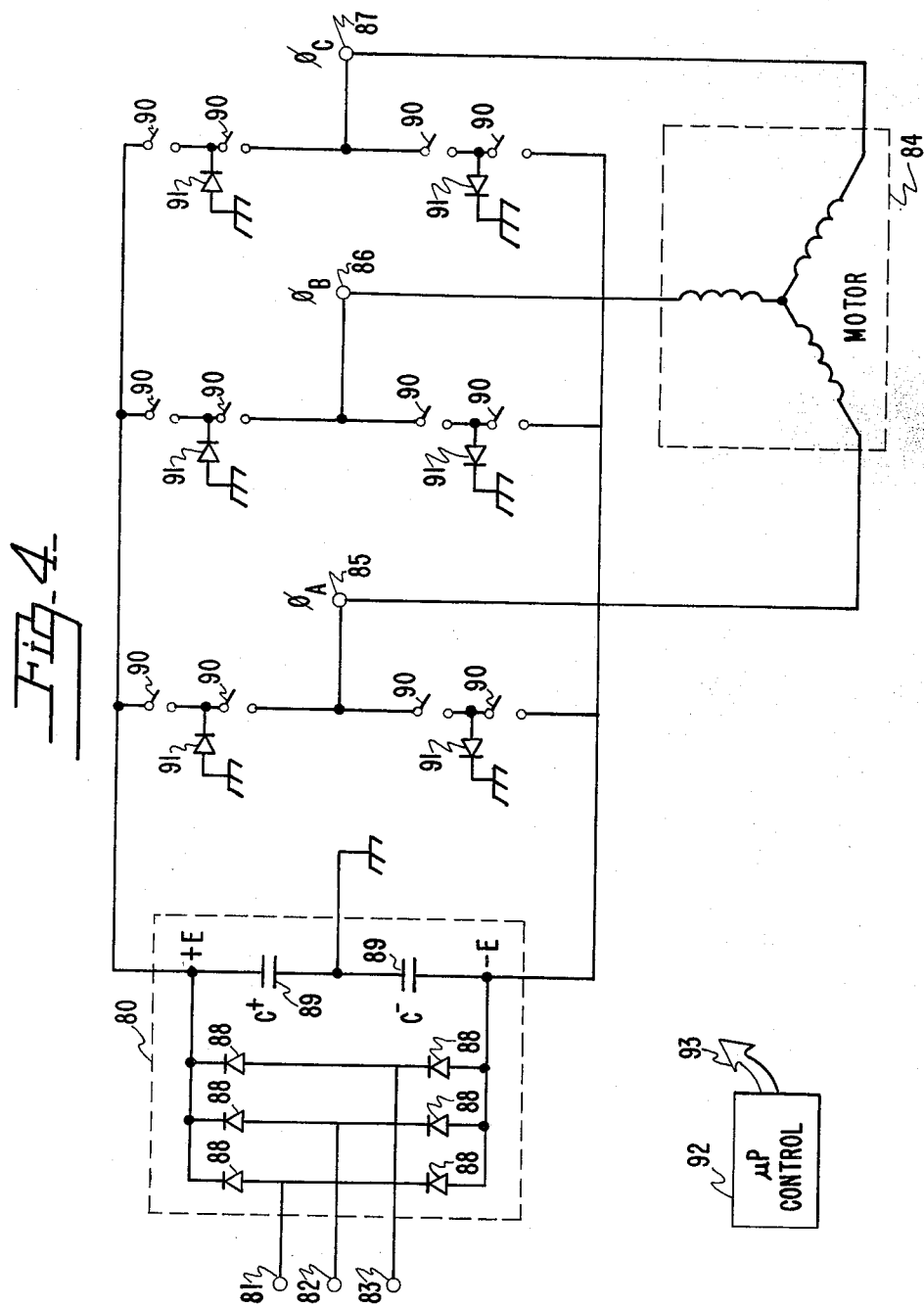
FIGS. 4 and 5 show circuit schematic diagrams of second and third embodiments, respectively, of the invention.

In FIG. 4, a three-phase converter circuit representing a second embodiment of the invention is shown. This three-phase converter circuit is obtained by adding a third bank of SPST switches to the circuit of FIG. 1. A three-phase rectifier circuit 80 is included for rectifying a three-phase AC input voltage applied to terminals 81–83, respectively, into $+E$ and $-E$ volts, for providing the DC operating voltages for the bridge inverter circuit. The windings of a three-phase motor 84 are shown connected to the phase A,B and C, output terminals 85–87, respectively, for example. The three-phase rectifier 80 includes six diodes 88 arranged for providing full-wave rectification, and two filter capacitors 89. Each upper and lower leg of the three-phase bridge network includes a pair of SPST switching devices 90, and a diode 91. Antiparallel diodes, such as 72–79 of FIG. 3, are not shown in FIG. 4 for the sake of simplicity, but should be included if reactive loads are being driven by the converter circuit. Note that the three-phase rectifier circuit 80 can be replaced by any supply of DC voltage capable of providing the operating voltages $+E$ and $-E$ volts to the bridge. The microprocessor 92 is included as a controller, for example, and is programmed for producing the necessary control signals represented by the arrow 93, for operating individually the switches 90, to produce the output signals from phase A, phase B and phase C. The waveform for the output signals produced across or between any two of the output terminals 85–87, is typically as shown in FIG. 2. The microprocessor 92 is programmed for operating the switches 90 to produce the output voltage across terminals 85 and 86 to be 120° out of phase with the output voltage across terminals 86 and 87, and 240° out of phase with the output voltage across terminals 85 and 87, for example.

The bridge converter circuit of FIG. 4 can be expanded to provide a polyphase output voltage of greater than three phases by adding additional upper and lower legs of switches 90 and diodes 91 to the bridge network. Each new upper and lower leg so added provides an additional phase. Also, higher levels of DC voltage can be converted into higher amplitude AC output waveforms by adding additional diodes 91 and switches 90 to each leg of the bridge, as required. My copending application, Ser. No. 944,633, filed on Sept. 21, 1978, now U.S. Pat. No. 4,210,826, for SWITCHING CIRCUIT teaches circuit means for cascoding a plurality of relatively low voltage transistors for switching relatively high levels of voltage, and such teachings are directly applicable for use in the various embodiments of the present invention, for converting relatively high levels of DC voltage into stepwise approximated AC waveforms. For example, in FIG. 5 a third embodiment of the invention is shown incorporating the teachings of my aforementioned invention for SWITCHING CIRCUIT, for converting DC voltages having levels as high as +1600 volts into polyphase AC output voltages, wherein each one of the cascoded switching devices 94 in the upper and lower legs of each phase of the bridge converter have a voltage rating of only 400 volts. Basically, this is accomplished in the positive leg of each phase via the connection of the diodes 96 individually between the common connections of the positive leg switches 94 and the voltage terminals 101 through 107, respectively; and in the negative leg of each phase a comparable result is obtained via the individual connection of each one of the oppositely polarized diodes 98 between the common connections of the switching devices 94 of the negative leg and the voltage terminals 101 through 107, respectively. In addition, it is further required that the switching devices 94 in each leg of the bridge be closed only in sequential order proceeding from the switching device 94 closest to the output terminal of that phase to the switching device 94 connected to the voltage terminal receiving the highest level of voltage, such as terminal 100 receiving +1600 volts in the positive legs, and terminal 108 receiving −1600 volts in the negative leg, of each phase of the bridge; correspondingly, the switching devices 94 must be sequentially opened in the opposite order relative to their closure. Also, with respect to the switching devices 94, assuming a balanced system, no more than the number of switches in each leg can be closed at any given time in the legs of each phase of the bridge. For example, in phase A there are eight switching devices 94 in each of the upper and lower legs of this phase; therefore, the total number of switches that can be closed in phase A in the upper and lower legs at any given time are eight. In this manner, no more than 400 volts can be applied across any one of the switching devices 94, thereby permitting the use of 400 volt switching devices 94 for switching up to 1600 volts. The waveform for control of the switches in phase A is developed at output terminal 110. The circuitry for phases B,C, through the Nth phase are identical to the circuitry shown for phase A. A controller 109, such as a microprocessor, is programmed for producing the control signals represented by arrow 110. for controlling the opening and closing of the switches 94 of each phase of the present bridge converter for producing the desired polyphase AC output voltages.

Figure 5:
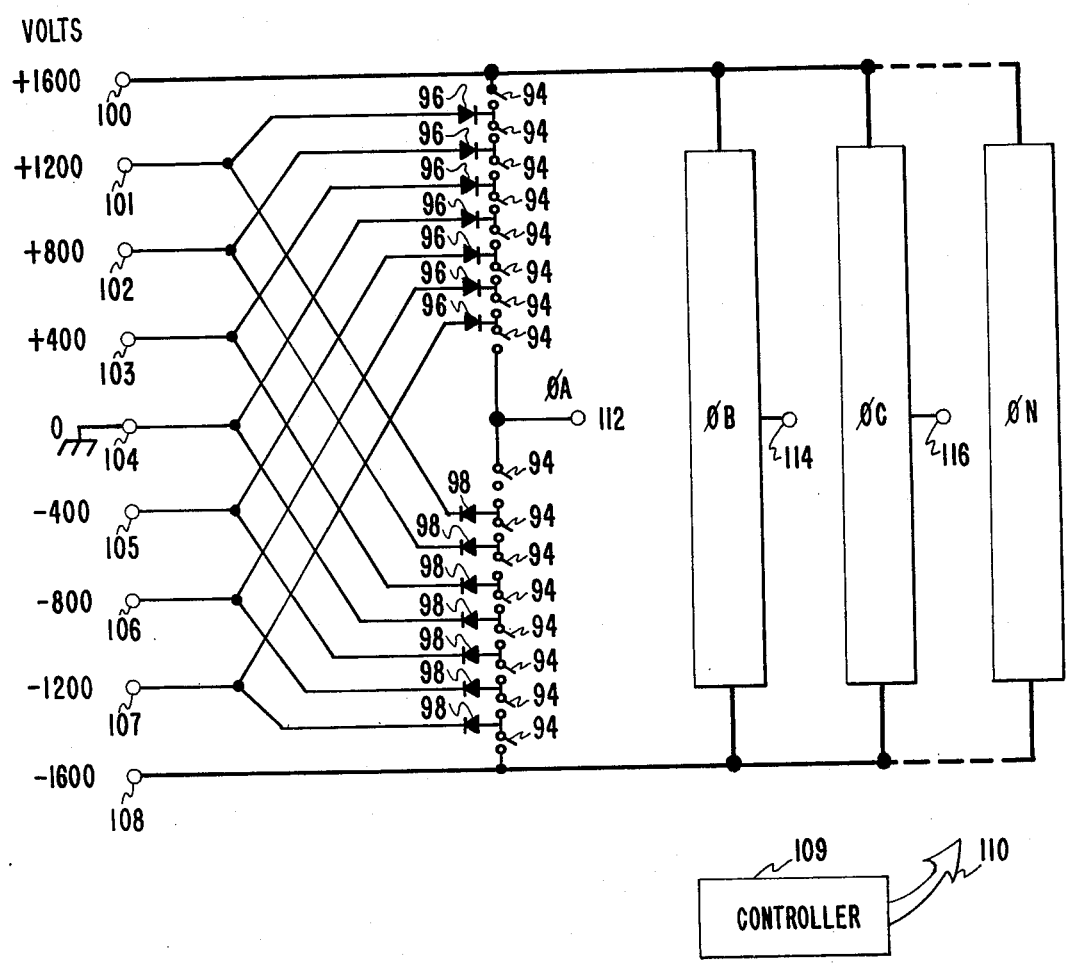
Figure 6:
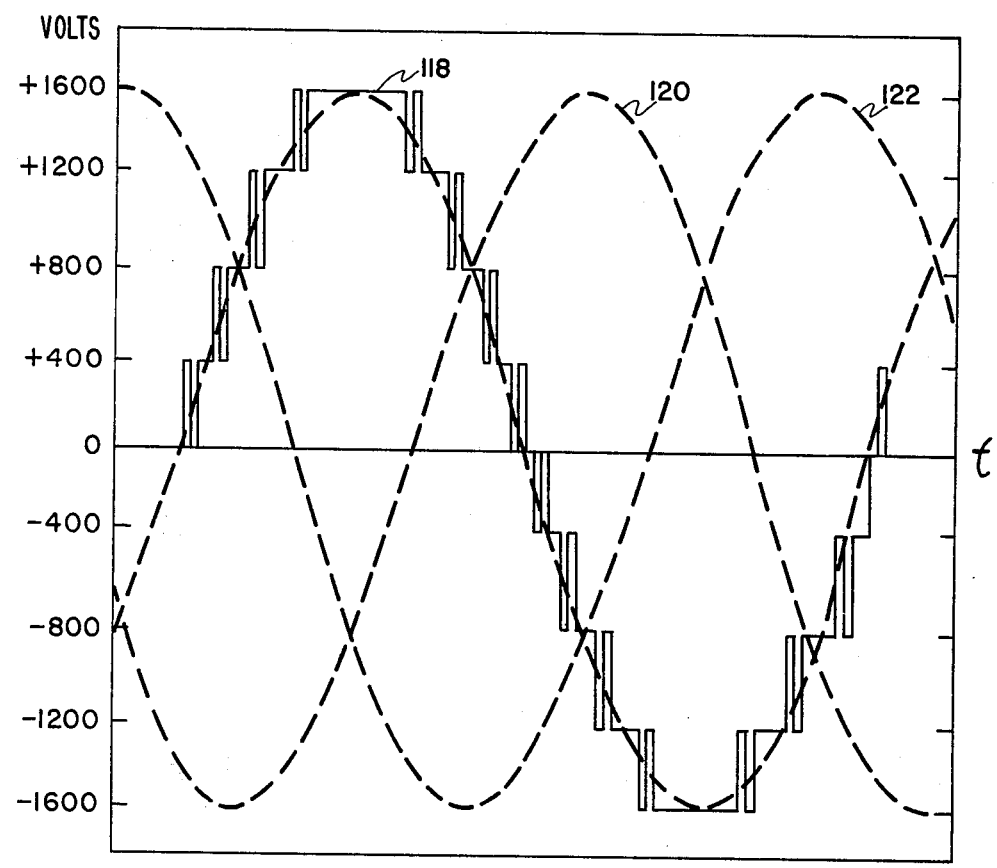
FIG. 6 shows typical waveforms produced by the circuit of FIG. 5.

The converter of FIG. 5 is operable for producing between output terminals 112, 114 and 116, the three-phase related sine waves 118, 120 and 122, respectively, as shown in FIG. 6. Each one of these waveforms 118, 120, 122 is a stepwise approximated sinewave as shown for waveform 118, but for simplicity the waveforms 120 and 122 are shown as their pure sine waves equivalents. Assuming that a threephase motor is connected to output terminals 112, 114, and 116, of phases A, B and C, respectively, waveform 118 is produced between output terminals 112 and 114, waveform 120 between output terminals 114 and 116, and waveform 122 between output terminals 112 and 116. Note that as taught in my copending application for SWITCHING CIRCUIT if the amplitude of the voltage across the load (assume a reactive load) at any time is more positive than the positive-going output voltage of the related phase, or more negative than the negative-going output voltage of the related phase, current flow is maintained through the load via the bidirectional current paths provided by the combination of the voltage sources connected to terminals 100 through 108, the closed ones of the switches 94 and the diodes 96 or 98 associated with these closed switches 94. Such bidirectional current flow is also provided in the converter circuits of FIGS. 1, 3 and 4, as previously described. For example, assume that an output terminal 112 a +400 volt step is being produced via the closure of the first five switches 94 in the positive leg of phase A relative to terminal 112, concurrent with the closure of the first three switches 94 in the negative leg relative to terminal 112. So long as the voltage across the load connected to terminal 112 is below 400 volts, current will flow from the +400 volt voltage source connected to terminal 103, through the diode 96 connected to the common connection between the fifth and sixth switching devices 94 relative to terminal 112, through the five closed switches 94, to output terminal 112, and into the load. If the voltage across the load suddenly increases at this time, due to some transient, to an amplitude greater than +400 volts, current will flow from the load into output terminal 112 and through the closed ones of the switching devices 94 in the negative leg, through the diode 98 connected to the common connection between the third and fourth switching devices 94 in the negative leg relative to terminal 112, and into the voltage source supplying +400 volts to terminal 103. Note that where the switching devices 94 are not electromechanical switches, as illustrated for the sake of simplicity, but are transistor switches (such as NPN transistors), then anti-parallel diodes (not shown) are connected across the collector-emitter electrodes of each one of these transistors for providing the necessary bidirectional current flow for permitting the continuous flow of current through reactive loads as previously described. In other words, in certain combinations of open and closed conditions of the switching devices 94, whenever the voltage across the load exceeds the amplitude of the output voltage, the necessary oppositely directed flow of current through the load will flow through the antiparallel diodes associated with certain ones of the closed switches, in flowing to or from a certain one of the voltage terminals 100 through 108. For another example, if in the positive leg of phase A all of the switching devices 94 are NPN transistors, and each is operated to be turned on (switches closed), +1600 volts is applied to the load at output terminal 112. If the voltage across the load exceeds +1600 volts, then current will flow from the load through output terminal 112 and the antiparallel diodes connected across each one of the positive leg switches 94, and into the source of voltage supplying the +1600 volts to terminal 100. This bidirectional flow of current is described in detail in my copending application for SWITCHING CIRCUIT, mentioned above.

Any number of SPST switching devices from two to n/2 can be connected in series in each upper and lower leg of each phase of the present converter circuit, where n is an even integer number other than 2 (n=4,6,8,10 . . . ). This is true for either single- or polyphase-converter configurations of the present invention. From FIGS. 1 and 5, it has been determined that for each upper and lower leg of each embodiment of the present bridge converter [(n/2)−1] diodes are required. As shown, the diodes in the upper or positive legs of each phase are polarized oppositely to the diodes in the lower or negative legs of each phase. As previously mentioned, in FIG. 5 it is assumed that switching devices 94 each having 400 volts open-circuit voltage ratings are being used (if each device 94 is a transistor, then the $V_{CEX}$ of each is 400 volts, that is the voltage rating between collector and emitter electrodes with the same back-bias on the base electrode of each transistor is 400 volts). If E is defined as some constant number, and nE as the maximum level of positive or negative voltage being converted, then in FIG. 5 n is equal to 16 (n/2=8, number of switches 94 in each leg), and E is 100 (nE=1600). Accordingly, each switching device 94 has an open-circuit voltage rating of 4 E volts, in the example of FIG. 5. Assuming the sequential closing of switching devices from the output terminal of each phase towards +nE or −nE volts, and the opening of the switches in the opposite sequence, then the connection of the (n/2−1) diodes 96, beginning from the uppermost first common connection between the uppermost two of the n/2 switching devices 94 of the upper legs, relative to the terminal receiving +nE volts (terminal 100 in FIG. 5), proceeding sequentially downward to the [(n/2)−1] common connection between the lowermost two of the n/2 switching means 94, have their cathode electrodes connected to an individual numerically corresponding of these [(n/2)−1] common connections, and their anode electrodes individually receiving a different and progressively lower level of DC voltage, respectively (+1200, +800, +400, 0, −400, −800, −1200 volts in the example of FIG. 5). Similarly, for the lower legs of each phase, beginning from the uppermost first common connection between the uppermost two of the n/2 switches 94, relative to the output terminal for that phase, proceeding sequentially downward to the [(n/2)−1] between the lowermost two of the switches 94 of the lower or negative legs, each one of the diodes 98 (see FIG. 5) have their anode electrodes connected to an individual corresponding numerically one of these [(n/2)−1] common connections, and their cathode electrodes to the anode electrodes of the numerically corresponding or like positioned one of the [(n/2)−1] diodes 96 of the positive leg. As in FIG. 5, for the various embodiments of the present invention, the values of the different levels of DC voltage are chosen for ensuring that the open-circuit voltage breakdown of the switches 94 are not exceeded. In this manner bidirectional current flow between the load and the converter is also ensured, as previously discussed, provided that antiparallel diodes are connected across each switch 94, when the switches are transistors, for example.

Note that in FIG. 5, DC voltages of +1600, +1200, +800, +400, 0, −400, −800, −1200, −1600 volts are designated as being applied to terminals 100-108, respectively. These voltages can be supplied by a series string of DC voltage sources (not shown), having a center tap connected to reference terminal 104, and other individual voltage taps for supplying the aforementioned ±DC voltages, as would be known to one skilled in the art. In the nth embodiment of the invention, in like manner a string of a plurality of DC voltage sources can be connected in series, with the center of the string connected to a reference voltage terminal common to the bridge converter circuit, and a plurality of [(n/2)−1] voltage taps for providing the various ±DC operating voltages, in addition to providing ±nE volts.

In FIG. 7, there is shown a switching circuit preferred for use in providing each individual single-pole-single-throw switching device shown in the circuits of FIGS. 1, 3, 4 and 5 of the present invention. Note that in FIG. 3, each transistor-diode combination of transistors 29-36, and diodes 72-79, respectively, can be replaced by this preferred switching circuit. This switching circuit is the subject of applicant's co-pending application Ser. No. 944,632, filed on Sept. 21, 1978 for FLOATING POWER SWITCH, where the operation and circuit is described in detail. Applicant developed this switching circuit specifically to overcome the problems in the prior art in obtaining reliable operation of switching circuits having more than two transistors connected in cascode for switching relatively high levels of voltage. Important features of the switching circuit of FIG. 7 include the optical coupler 200 and local power supply 202. The optical coupler 200 electrically isolates the switching circuit from the source of control signals (a microprocessor, for example) connected between input terminals 204, 206, permitting the levels of voltage at the power terminals 208 and 210 to float up and down independently of the voltage applied across the input terminals 204, 206. The local supply 202 includes a transformer 212, which serves both to isolate the source of AC voltage applied between terminals 214 and 216 from other portions of the switching circuit, and to provide via secondary winding a predetermined level of AC voltage for driving the full-wave bridge rectifier of diodes 218-221. The center tap of the secondary winding of the transformer 212 is connected in common to power terminal 210 and filter capacitors 222 and 224, thereby referencing the DC operating voltages +V and −V to whatever voltage is applied to the power terminal 210. These operating voltages +V and −V are applied to operating voltage rails or buses 226, 228 respectively. Referencing of the operating voltages +V and −V to the voltage applied to power terminal 210 ensures that the operating voltage levels will remain at the proper operating levels relative to the voltage at power terminal 210, thereby permitting the switching circuit to be included at any position within a cascoded chain or string of such switching circuits as shown in FIGS. 1, 3, 4 and 5.

Operation of the circuit of FIG. 7 will now be described. Assume that the switching circuit is turned off, in which condition the Darlington connected transistors 230, 231 are turned off, thereby causing a substantially high impedance to exist between terminals 208 and 210. This is analogous to an open single-pole-single-throw switch having contacts represented by terminals 208 and 210. To turn on the switching circuit, a control signal is applied between input terminals 204 and 206, for causing a current $i_T$ to flow as shown through the current-limiting resistor 205, and the light-emitting diode 232 of the optical coupler 200. In response to this flow of current, diode 232 emits infrared radiation which is detected by the photodiode 234. The photodiode 234 responds to this light by substantially lowering its impedance, thereby permitting current to flow from voltage rail 226 (the +V voltage side of local supply 202) into the base electrode of transistor 236 of the optical coupler 200, and through the resistor 238 to the −V operating voltage rail 228 causing transistor 236 to turn on. When transistor 236 so turns on, current flows from the positive voltage rail 226, through resistor 240 and the collector-emitter current path of transistor 236 to the negative voltage rail 228, in turn causing the level of voltage at the input terminal of inverter 242 to decrease in potential from substantially +V to −V volts. In response to this drop in voltage at its input terminal, inverter 242 changes the level of the voltage at its output terminal from a relatively low level to a relatively high level. Inverter 244 changes the condition of the level of its output signal from a relatively high level to a relatively low level (about −V volts), in response to the change in the level of the output signal from inverter 242, thereby "pulling down" the base electrode of Darlington transistor 246, the latter remaining in a saturated state because of minority charge carrier storage in its base region. Before Darlington transistor 246 becomes unsaturated because of the recombination of minority carriers in its base region, inverter 248 changes the level of its output signal from a high level to a low level, in response to the change in the level of the output signal from inverter 242. Inverter 250 changes the level of its output signal from a low level to a high level with a time delay determined by the values of resistor 252 and capacitor 254, in response to the low level output signal from inverter 248, the now-positive-going output signal from inverter 250 exceeds the input threshold level of inverter 256, the latter responds by changing the level of its output signal from a high level to a low level, causing current to flow from the positive rail 226 through resistors 258 and 260 into the output terminal of inverter 256, and from the base electrode of transistor 262 through current-limiting resistor 260 into the output terminal of inverter 256. In this manner, transistor 262 is turned on about two microseconds after the change in the output signal of inverter 242 from a low level to a high level. When transistor 262 so turns on, substantially +V volts is applied via the emitter-collector current path of transistor 262 (now having a substantially low impedance), and the combination of resistor 264 in parallel with the series circuit of capacitor 266 and resistor 268, to the collector electrode of Darlington transistor 246, causing the latter to come out of saturation and turn off. When Darlington transistor 246 comes out of saturation, the large transient current flowing through capacitor 266 and resistor 268 (controls magnitude of current) flows into the base electrode of transistor 230, overdriving the Darlington circuit 230,231 to cause it to turn on in a substantially short period of time (transistors 230 and 231 turned on). After the turnon overdrive transient current subsides due to the charging of the speedup capacitor 266, the magnitude of the base current applied to the base electrode of transistor 230 is controlled by the value of resistor 264 for maintaining the Darlington circuit 230,231 turned on. When the Darlington circuit 230,231 so turns on, the impedance between the collector and emitter electrodes of transistor 231 is substantially reduced, for connecting power terminal 208 to output terminal 210, permitting current to flow therebetween. At this time, in response to the low level of output signal from inverter 248, inverter 270 is producing a high level of output signal for application via resistor 272 to the base electrode of transistor 274, keeping this transistor turned off.

When the switching circuit of FIG. 7 is operated as described above for turning on the output Darlington 230,231, and thereafter it is desired to turn off this Darlington circuit, the input signal applied across terminals 204 and 206 is removed to interrupt the current $i_T$ flowing through the light-emitting diode 232. Next, in sequential order, the impedance of photodiode 234 substantially increases, preventing the flow of base current for transistor 236, causing transistor 236 to turn off. When transistor 236 turns off, the voltage at its collector electrode rises toward the positive rail 226, causing about +V volts to be applied to the input terminal of inverter 242, the latter responding by changing the level of its output signal from a high level to a low level, the inverters 244 and 248 responding thereto by changing the level of their output signals from a low level to a high level. When the output signal from inverter 248 goes high, inverter 270 responds thereto by changing the level of its output signal from a high level to a low level, permitting current to flow from the positive rail 226 through the resistors 276 and 272 into the output terminal of inverter 270. Also, base current flows from transistor 274 through resistor 272 into the output terminal of inverter 270, thereby turning on transistor 274, causing a large transient current to flow from the positive rail 226 through the collector-emitter current path of transistor 274, and substantially through the speedup circuit of capacitor 278 and resistors 280 and 282, into the base electrode of Darlington transistor 246, thereby providing fast turnon of this Darlington transistor. The time constant of the speedup circuit 278, 280, 282 is such that shortly after the Darlington transistor 246 turns on, capacitor 278 charges, and the sustaining current for keeping on the Darlington transistor 246 is provided via resistor 282 and the collector-emitter current path of transistor 274 from the positive rail 226. The hard turnon of Darlington transistor 246 overrides the static "on current" flowing from resistor 264 into the base electrode of transistor 230, and causes a large current to flow out of the bases of transistors 230 and 231, with the base current from transistor 231 flowing into the collector electrode of Darlington transistor 246 via the current path provided by diodes 284 and 286. This causes the output Darlington 230, 231 to go out of saturation and rapidly turn off with correspondingly low turned-off power dissipation. Note that at the same time Darlington transistor 246 turns on, inverter 250 changes its output signal from a high level to a low level, in response to the high level output signal from inverter 248. Inverter 256 changes the level of its output signal from a low level to a high level, in response to the change in level of the output signal from inverter 250, thereby turning off transistor 262. Also note that resistors 288 and 290 serve as "pull-up" resistors for inverters 248 and 250, respectively; that resistors 292 and 294 serve as biasing resistors; and that diode 296 permits the collector-base junctions of transistors 230 and 231 to be discharged when the $V_{CE}$ across these transistors drops from a high positive to a relatively low positive value. The antiparallel diode 298 across Darlington circuit 230,231 is included to provide bilateral current flow for the Darlington switching circuit 230,231, whereby when the switching circuit turns off, current can flow from reactive loads connected to output terminal 210 through diode 298 and into power terminal 208. To connect a plurality of switching circuits identical to FIG. 7 in cascode, the terminal 208 of a first individual circuit is connected to the terminal 210 of a second individual circuit, and the terminal 210 of the first individual circuit is connected to the terminal 208 of a third individual circuit, and so forth.

What is claimed is:

1. A bridge converter circuit, comprising:
    a first operating voltage terminal for receiving +E volts;
    a second operating voltage terminal for receiving −E volts;
    a reference voltage terminal for receiving a reference potential;
    first and second output terminals for connection to a load therebetween;
    first and second banks of switches located in diagonally opposing arms of said bridge converter, each bank having first, second, and third terminals, their first terminals being individually connected to said first and second operating voltage terminals, respectively, and their second terminals being individually connected to said first and second output terminals, respectively;
    first diode means having an anode electrode connected to said reference voltage terminal, and a cathode electrode connected to the third terminal of and in combination with said first bank of switches forming a gated unidirectional current path; and
    second diode means having a cathode electrode connected to said reference voltage terminal, and an anode electrode connected to the third terminal of and in combination with said second bank of switches forming a gated unidirectional current path;

said first and second banks of switches each being operable to a first condition for electrically connecting their respective second and third terminals together, to a second condition for electrically connecting their respective first, second and third terminals, together, said first and second banks of switches being concurrently operable to their first conditions for producing zero volts across said load, to their second and first conditions, respectively, for producing +E volts across said load, and to their second conditions for producing +2E volts across said load, whereby said first and second banks of switches are repetitively operable through a given sequence of the latter three combinations of their respective conditions, for producing a predetermined half-wave positive polarity AC voltage waveform across said load.

2. The bridge converter circuit of claim 1, further including:

third and fourth banks of switches located in the other diagonally opposing arms of said bridge converter, each of these banks having first, second and third terminals, their first terminals being individually connected to said first and second operating voltage terminals, respectively, and their second terminals being individually connected to said second and first output terminals, respectively;

third diode means having an anode electrode connected to said reference voltage terminal, and a cathode electrode connected to the third terminal of and in combination with said third bank of switches forming a gated unidirectional current path; and fourth diode means having a cathode electrode connected to said reference voltage terminal, and an anode electrode connected to the third terminal of and in combination with said fourth bank of switches forming a gated unidirectional current path;

said third and fourth banks of switches each being operable to a first condition for electrically connecting their respective second and third terminals together, to a second condition for electrically connecting their respective first, second and third terminals together, said third and fourth banks of switches being concurrently operable to their first conditions for producing zero volt across said load, to their first and second conditions, respectively, for producing −E volts across said load, and to their second conditions for producing −2E volts across said load, whereby said third and fourth banks of switches are repetitively operable through a given sequence of the latter three combinations of their respective conditions, for producing a predetermined half-wave negative polarity AC voltage waveform across said load, and for producing in combination with said first and second banks of switches a predetermined full-wave AC voltage waveform across said load.

3. The bridge converter circuit of claim 2, wherein each one of said first through fourth banks of switches include:

a first single-pole-single-throw switch means connected between said first and third terminals; and a second single-pole-single-throw switch means connected between said second and third terminals;

whereby said first and second switch means are operable to their open and closed circuit states, respectively, for providing the first condition of their respective bank of switches, and concurrently to their closed circuit states, for providing the second condition of their respective bank of switches.

4. The bridge converter circuit of claim 3, wherein said first and second single-pole-single-throw switch means each include a transistor having a main current path connected between said first and third terminals, and said second and third terminals, respectively, each transistor also having a base electrode receptive of an individual control signal for operating the respective transistor, and wherein said first through fourth diode means, when forwardbiased, also serve to clamp the common connection between their associated transistors to within a diode drop of said reference potential, thereby protecting said transistors in their nonconductive states from overvoltage conditions across their main current paths.

5. The bridge converter circuit of claim 4, further including a plurality of diodes, each one of said diodes being individually connected in antiparallel across the main current paths of said transistors of said first through fourth switching banks, respectively, for providing bilateral current flow between said bridge converter and said load.

6. The bridge converter circuit of claim 1, further including:

rectifier means receptive of an AC input voltage, for rectifying this voltage to produce said +E and −E volts referenced to said reference potential, thereby configuring said bridge converter as an AC to AC converter circuit.

7. The bridge conveter circuit of claim 1, further including:

a first DC voltage source connected between said reference voltage terminal and said first operating voltage terminal, for producing said +E volts; and a second DC voltage source connected between said reference voltage terminal and said second operating voltage terminal, for producing said −E volts.

8. A bridge converter circuit, comprising:

a first operating voltage terminal for receiving +E volts;

a second operating voltage terminal for receiving −E volts;

a reference voltage terminal for receiving a reference potential;

first and second output terminals for connection to a load therebetween;

first through fourth banks of switches each having first, second and third terminals, the second terminals of said first and second banks of switches being connected in common to said first output terminal, the second terminals of said third and fourth banks of switches being connected in common to said second output terminal, the first terminals of said first and third banks of switches being connected in common to said first operating voltage terminal, and the first terminals of said second and fourth banks of switches being connected in common to said second operating voltage terminal;

first and second diode means individually connected between and polarized for both (1) passing current only from said reference voltage terminal to said third terminals of said first and third banks of switches respectively and (2) when forwardbiased clamping their respective third terminal to within one diode voltage drop of said reference potential, thereby protecting their respective bank of switches from overvoltage;

third and fourth diode means individually connected between and polarized for both (1) passing current only from said third terminals of said second and fourth banks of switches, respectively, to said reference voltage terminal and (2) when forwardbiased clamping their respective third terminal to within one diode voltage drop of said reference potential, thereby protecting their respective bank of switches from overvoltage; and control means for sequentially operating said converter circuit from one to another of first through fifth combinations of operative states of said first through fourth banks of switches, in a predetermined manner for producing a desired AC voltage across said load, whereby in said first combination said first through fourth banks of switches are operated to connect their respective second and third terminals together, thereby providing bidirectional current flow between said reference voltage terminal and said first and second output terminals, respectively, and applying said reference potential to these output terminals, producing zero volt across said load, in said second combination said first bank of switches is operated for connecting its first, second and third terminals together, and said fourth bank of switches is operated for connecting its second and third terminals together, for applying $+E$ volts to said first output terminal and across said load, in said third combination said first and fourth banks of switching means are operated for connecting their respective first, second and third terminals together, for applying $+E$ volts to said first output terminal, $-E$ volts to said second output terminal, and thereby $+2E$ volts across said load, in said fourth combination said third bank of switches is operated for connecting its second and third terminals together, and said second switching means is operated for connecting its first, second and third terminals together for applying $-E$ volts to said first output terminal and across said load, and in said fifth combination said second and third banks of switches are operated for connecting their respective first, second and third terminals together for applying $-E$ volts to said first output terminal, $+E$ volts to said second output terminal, and thereby $-2E$ volts across said load.

9. The bridge converter circuit of claim 8, wherein said first through fourth banks of switches each include:

first switching means connected between said first and third terminals having a first condition for producing a substantially high impedance current path between these terminals, and a second condition for producing a relatively low impedance current conduction path between these terminals; and second switching means connected between said second and third terminals, having a first condition for producing a substantially high impedance current path between these terminals, and a second condition for producing a substantially low impedance current path between these terminals;

whereby said control means concurrently operates the first and second switching means of each one of said first through fourth banks of switches to one of their first and second conditions, respectively, for selectively providing one of said first through fifth combinations of operative states of said first through fourth banks of switches.

10. The bridge converter circuit of claim 9, wherein said first and second switching means each include semiconductor switching means having a main current path connected between said first and third terminals, and said second and third terminals, respectively, and a control electrode for receiving an individual control signal, said control means producing said control signals for operating said semiconductor switching means to a conductive state in said second condition, and nonconductive state in said first condition.

11. A bridge converter circuit, comprising:

rectifier means for converting a first AC voltage into first and second DC voltages having levels of $+E$ and $-E$ volts, respectively, relative to a source of reference potential;

first and second output terminals for applying a second AC voltage across a load connected therebetween;

first through fourth switching means each having a first terminal, a second terminal and a third terminal, said first and second switching means having their first terminals for receiving $+E$ volts and $-E$ volts, respectively, and their second terminals connected in common to said first output terminal, said third and fourth switching means having their first terminals for receiving $+E$ volts and $-E$ volts, respectively, and their second terminal connected in common to said second output terminal;

first and second diode means each having an anode electrode connected in common to said source of reference potential, and a cathode electrode connected individually to said third terminal of said first and third switching means, respectively, the combination being operable for providing oppositely directed unidirectional gated current paths between said first output terminal and said source of reference potential, respectively, and third and fourth diode means each having a cathode electrode connected in common to said source of reference potential, and an anode electrode connected individually to said third terminal of said second and fourth switching means, respectively, this combination being operable for providing oppositely directed unidirectional gated current paths between said second output terminal and said source of reference potential, respectively, said first through fourth diode means also serving to limit the voltage drop across the first and third terminals, and second and third terminals of said first, third, second, and fourth switching means to E volts, respectively;

said first through fourth switching means each being operable to a first condition providing a current conduction path only between the second and third terminals, respectively, to a second condition concurrently providing current conduction paths between their first, second, and third terminals, respectively, and to a third condition providing substantial isolation between their said first, second and third terminals, respectively;

said first through fourth switching means each being concurrently operable to said first condition, for establishing a first configuration of said converter for applying zero volts between said first and second output terminals, and providing bidirectional current flow between each one of said first and second output terminals and said source of reference potential;

said first through fourth switching means each being concurrently operable to their second, third, first, and first conditions, respectively, for establishing a second configuration of said converter for applying +E volts to said first output terminal and said source of reference potential to said second output terminal;

said first through fourth switching means being concurrently operable to their second, third, third, and second conditions, respectively, for establishing a third configuration of said converter for applying substantially +E volts to said first output terminal, and −E volts to said second output terminal;

said first through fourth switching means being concurrently operable to their third, second, first, and third conditions, respectively, for establishing a fourth configuration of said converter for applying −E volts to said first output terminal, and said source of reference potential to said second output terminal;

said first through fourth switching means being concurrently operable to their third, second, second, and third conditions, respectively, for establishing a fifth configuration of said converter for applying substantially −E volts to said first output terminal, and +E volts to said second output terminal;

said converter being operable in a predetermined sequence of its first through fifth configurations, for producing said second AC voltage.

12. The converter circuit of claim 11, further including:
first AC ripple filtering means connected between the first terminal of said first switching means and said source of reference potential; and
second AC ripple filtering means connected between the first terminal of said second switching means and said source of reference of potential.

13. The converter circuit of claim 12, wherein said first and second AC ripple filtering means each include a capacitor.

14. A method for converting DC voltages having levels of +E and −E volts relative to a reference potential applied to a reference voltage terminal, into an AC voltage for application across a load connected between first and second output terminals, comprising a predetermined sequence of the combination of the following steps:
applying said reference potential to said first and second output terminals, while providing bidirectional current flow between said reference voltage terminal, and each one of said first and second output terminals, for producing zero volt across said load;
applying +E volts to said first output terminal, while providing unidirectional current flow from said second output terminal to said reference voltage terminal, for producing +E volts across said load;
applying +E volts and −E volts to said first and second output terminals, respectively, for producing +2E volts across said load;
applying −E volts to said first output terminal, while providing unidirectional current flow from said reference voltage terminal to said second output terminal, for producing −E volts across said load; and
applying −E volts and +E volts to said first and second output terminals, respectively, for producing −2E volts across said load.

15. A polyphase bridge converter circuit, comprising:
a first operating voltage terminal for receiving +E volts;
a second operating voltage terminal for receiving −E volts;
a reference voltage terminal for connection to a point of reference potential; and
a plurality of phase banks each including:
an output terminal;
at least first through fourth switching means each having a main current conduction path, the main current conduction paths of said first through fourth switching means being connected in series in that order from said first to said second operating voltage terminals, the common connection between said second and third switching means being connected to said output terminal, each one of said first through fourth switching means being operable to a first condition for closing or substantially lowering the impedance of its main current conduction path, and to a second condition for opening or substantially increasing the relative impedance of its main current path;
first unidirectional current means connected between said reference voltage terminal and the common connection between said first and second switching means, and polarized for conducting current from said reference voltage terminal to this common connection; and
second unidirectional current means connected between and polarized for conducting current from the common connection of said third and fourth switching means to said reference voltage terminal;
the first through fourth switching means of one of said plurality of phase banks being operable over repetitive periods of time through predetermined different combinations of their respective first and second conditions, during each time period, for producing stepwise approximations of desired polyphase related AC output voltages concurrently at the respective output terminals of each phase bank, the number of phase banks being at least equal to the number of phases of AC output voltage desired.

16. The converter circuit of claim 15, wherein the first through fourth switching means of each phase bank each include transistorized switching means having an output transistor connected in cascode with the output transistor of the other three transistorized switching means between said first and second operating voltage terminals.

17. The converter circuit of claim 16, further including a plurality of diodes, each one of which is individually connected in inverse parallel across the main current conduction paths of, and for providing bilateral switching of, said first through fourth switching means of each phase bank.

18. A bridge converter circuit, for converting up to +nE volts into polyphase AC output voltages, where n is an even integer number other than 2 (n=4, 6, 8, 10...), and E is a constant number, comprising:
first and second operating voltage terminals for receiving +nE volts and −nE volts, respectively;

a plurality of phase banks equal in number to at least the number of phases of AC output voltages desired, each including:

an output terminal;

a plurality of n/2 first switching means each having a main current conduction path, the main current conduction paths of said switching means being connected in series between said first operating voltage and said output terminals, each one of said switching means being selectively and individually operable to a first condition for opening their main current conduction path, and to a second condition for closing their main current conduction path;

a plurality of n/2 second switching means each having a main current conduction path, the main current conduction paths of said second switching means being connected in series between said output and second operating voltage terminals, each one of said second switching means being selectively and individually operable to a first condition for opening their main current conduction path, and to a second condition for closing their main current conduction path;

a plurality of $[(n/2)-1]$ first diodes each having a cathode electrode and an anode electrode;

a plurality of $[(n/2)-1]$ second diodes each having a cathode electrode and an anode electrode;

beginning from the uppermost first common connection between the uppermost two of said n/2 first switching means relative to said first terminal, proceeding sequentially downward to the $[(n/2)-1]$ common connection between the lowermost two of said n/2 switching means, each one of said $[(n/2)-1]$ first diodes having their cathode electrodes connected to an individual numerically corresponding one of these $[(n/2)-1]$ common connections, and their anode electrodes individually receiving a different and progressively lower level of DC voltage, respectively;

beginning from the uppermost first common connection between the uppermost two of said n/2 second switching means relative to said output terminal, proceeding sequentially downward to the $[(n/2)-1]$ common connection between the lowermost two of said n/2 second switching means, each one of said $[(n/2)-1]$ second diodes having their anode electrodes connected to an individual corresponding numerical one of these $[(n/2)-1]$ common connections, and their cathode electrodes to the anode electrodes of the numerically corresponding one of said $[(n/2)-1]$ first diodes, the values of the different levels of DC voltage being chosen for ensuring that the open-circuit voltage breakdown of said plurality of n/2 first and second switching means is not exceeded, provided that said n/2 first switching means are sequentially closed in order from the lowermost one to the uppermost one, and opened in reverse order, and that said n/2 second switching means are sequentially closed in order from the uppermost one to the lowermost one, and opened in reverse order, these switching means being operable to different combinations of their first and second conditions for producing any one of $[(n/2)+1]$ different levels of output voltage at said output terminal.

19. The bridge converter circuit of claim 18, further including:

a reference voltage terminal for connection to a point of reference potential;

a string of a plurality of DC voltage sources connected in series between said first and second operating voltage terminals, the center of said string of DC voltage sources being connected to said reference voltage terminal, said string of DC voltage sources having $[(n/2)-1]$ voltage taps, whereby, beginning from the uppermost voltage tap relative to said first operating voltage terminal down to the $[(n/2)-1]$ th tap, said taps are individually connected to the anode electrodes of the numerically corresponding ones of said plurality of $[(n/2)-1]$ first diodes, said string of DC voltage sources thereby supplying said $\pm nE$ operating voltages and said different levels of DC voltage.

20. The bridge converter circuit of claim 18, wherein each one of said plurality of n/2 first and n/2 second switching means includes a like conductivity transistor having a main current conduction path connected in cascode with the other main current conduction paths of the other $(n-1)$ transistors between said first and second operating voltage terminals, the centralmost common connection between said transistors being connected to said output terminal, each one of said transistors having a control terminal for receiving a control signal for operating it to one of its first and second conditions.

21. A method for converting DC voltages having levels of $+E$ and $-E$ volts relative to a reference potential applied to a reference voltage terminal, into an AC voltage for application across a load connected between first and second output terminals, comprising a predetermined sequence of the combination of the following steps:

applying said reference potential to said first and second output terminals, while providing bidirectional current flow between said reference voltage terminal, and each one of said first and second output terminals, for producing zero volt across said load;

applying $+E$ volts to said first output terminal, while providing bidirectional current flow from said second output terminal to said reference voltage terminal, for producing $+E$ volts across said load;

applying $+E$ volts and $-E$ volts to said first and second output terminals, respectively, for producing $+2E$ volts across said load;

applying $-E$ volts and $+E$ volts to said first output terminal, while providing bidirectional current flow from said reference voltage terminal to said second output terminal, for producing $-E$ volts across said load; and applying $-E$ volts to said first and second output terminals, respectively, for producing $-2E$ volts across said load.

* * * * *